United States Patent [19]

Peana et al.

[11] Patent Number: 5,158,421
[45] Date of Patent: Oct. 27, 1992

[54] CIRCUIT ASSEMBLY AND PLACEMENT APPARATUS

[75] Inventors: Daniel Peana; Andy Marozsan; Stefan Peana, all of Boca Raton, Fla.

[73] Assignee: Motorola, Inc., Schaumburg, Ill.

[21] Appl. No.: 678,511

[22] Filed: Apr. 1, 1991

[51] Int. Cl.⁵ .............................................. B25J 9/00
[52] U.S. Cl. ...................................... 414/751; 91/51; 901/22; 901/45
[58] Field of Search ............................... 414/750-753; 188/312; 901/45, 22; 91/51

[56] References Cited

U.S. PATENT DOCUMENTS

| | | | |
|---|---|---|---|
| 2,630,193 | 3/1953 | Funkhouser | 188/312 |
| 2,771,968 | 11/1956 | Mercier | 188/312 |
| 3,368,697 | 2/1968 | Carlson | 188/312 X |
| 3,654,613 | 4/1972 | Dunne et al. | 414/753 X |
| 3,984,006 | 10/1976 | Takeyasu et al. | 901/45 X |
| 4,702,667 | 10/1987 | Hounsfield et al. | 901/45 X |
| 4,720,923 | 1/1988 | Quinton et al. | 901/45 X |

FOREIGN PATENT DOCUMENTS

| | | | |
|---|---|---|---|
| 0144808 | 11/1980 | German Democratic Rep. | 188/312 |
| 1303399 | 4/1987 | U.S.S.R. | 901/22 |
| 1349999 | 11/1987 | U.S.S.R. | 901/22 |

*Primary Examiner*—David A. Bucci
*Assistant Examiner*—William M. Hienz
*Attorney, Agent, or Firm*—Philip P. Macnak; William E. Koch; Thomas E. Berry

[57] ABSTRACT

A circuit assembly device (200) comprises a cylinder (202) containing a piston (204) coupled to an end-effector for facilitating an assembly of a circuit carrying substrate. The piston (204) defines a first chamber (212) and a second chamber (214) in the cylinder (202) for maintaining substantially the same pressure such that a difference in areas of the first and second chambers (212, 214) establishes a compliant force on the end-effector.

4 Claims, 2 Drawing Sheets

CIRCUIT ASSEMBLY AND PLACEMENT APPARATUS

FIELD OF THE INVENTION

This invention relates in general to circuit assembly devices, and more specifically to a circuit assembly and placement apparatus and method.

BACKGROUND OF THE INVENTION

Typically, in an automated factory, precise measurements of manufacturing and processing are invaluable to the efficiency of the manufacturing process and the quality of the products produced. Ideally, devices used for holding products to be processed in a robotic operated factory need to be automatically operated to facilitate hands-free operations or eliminate human interventions as much as possible. This improves the speed of manufacturing or processing time and reduces injury to, or mistakes by, human operators. In this way, an automated factory ultimately produces higher quality products at lower manufacturing cost, which tends to increase profits to companies or reduce cost to consumers allowing domestic companies to be more competitive in world markets.

Usually, an automated factory produces high quality products by using the latest available technology in its internal manufacturing operations. However, a company focusing only on its own product manufacturing capabilities will not maintain its competitive edge for a sufficiently long time. That is, although it is important to achieve superiority in its internal manufacturing operations, to be a true leader, companies must be aware that products purchased from outside vendors may not always conform to the higher quality standards of their internal factory operations. With this awareness, it is of paramount importance to design for a reasonable variation in goods purchased from outside vendors. In this way, time-consuming operations are avoided when products vary without their design tolerances.

Especially in robotic end-effectors, for example, a multi-functional end-effector must have a reasonable tolerance built-in to compensate for variations in components size or over-travel by end effectors, etc. Typically, this tolerance is accomplished with the aid of springs, which allow the end effectors to vary within a limited range when there is an inadvertent contact by an end effector on a component or part. Unfortunately, to increase or decrease the range of variation, the spring must be changed to precisely match the new desired range. Also, springs subjected to high mechanical stress from continuous use will often fail because of metal fatigue.

Accordingly, a need exists for a quick and efficient compensation for variation in the tolerance ranges, and for prolonging continuous operation without undue fatigue from continuous use.

SUMMARY OF THE INVENTION

Briefly, according to the invention, a circuit assembly device comprises a cylinder containing a piston coupled to an end-effector for facilitating an assembly of a circuit carrying substrate. The piston defines a first chamber and a second chamber in the cylinder for maintaining substantially the same pressure such that a difference in areas of the first and second chambers establishes a compliant force on the end-effector.

DESCRIPTION OF A PREFERRED EMBODIMENT

Figure 1:
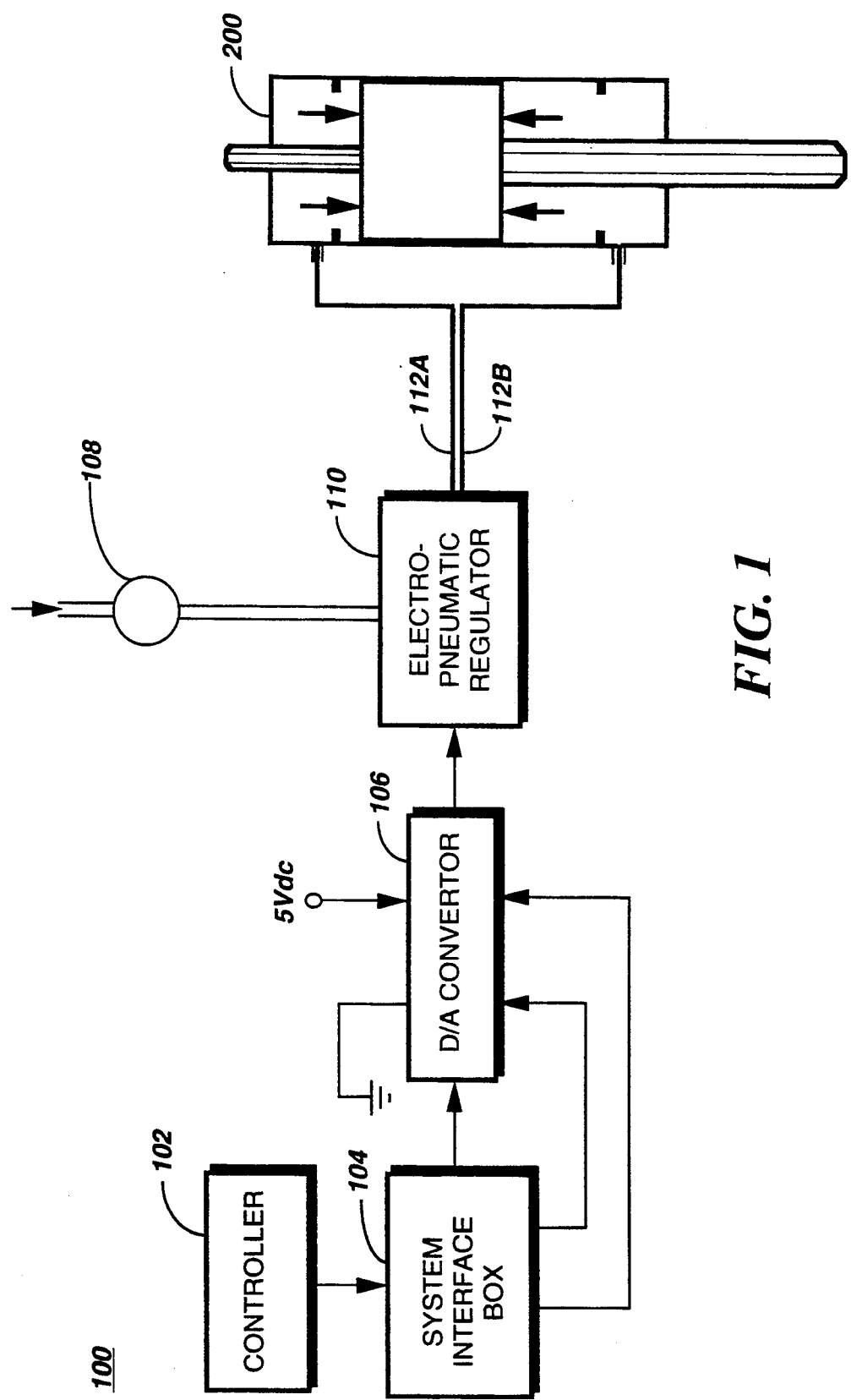
FIG. 1 is a block diagram of a controller and a circuit assembly device in accordance with the preferred embodiment of the present invention.

FIG. 1 shows a block diagram of a circuit assembly device in accordance with the preferred embodiment of the present invention. As shown, a controller 102 is coupled to a digital-to-analog (D/A) convertor 106 via a system interface box 104. The controller 102 preferably comprises digital circuitry that produces digital control signals which are preferably converted to analog signals to regulate an electro-pneumatic regulator 110. The system interface box 104 interfaces to, and limits, the digital control signals (preferably digital voltage signals) from the controller 102 so that the D/A convertor 106 may convert the digital signals to analog signals of appropriate levels. As shown, the D/A convertor 106 is preferably powered by a 5 Vdc supply, and when the D/A convertor 106 receives the digital voltage signal, it converts the digital voltage to an analog voltage to vary the pressure (air or fluid) delivered from a reservoir 108 to the circuit assembly device 200. Those skilled in the art will appreciate that the electro-pneumatic regulator 110, by conventional methods, uses analog voltage to vary the pressure of the air (or fluid) delivered to the circuit assembly device 200. As shown, the pressure delivered to the circuit assembly device 200 preferably comprises two lines 112A, B so that the pressure is independently controlled to a first and second chambers of the circuit assembly device 200. Thus, variations in the controller 102 produce a digital voltage which is preferably converted to an analog voltage used to activate the electro-pneumatic regulator 110 that regulates the pressure delivered to the circuit assembly device 200.

Figure 2:
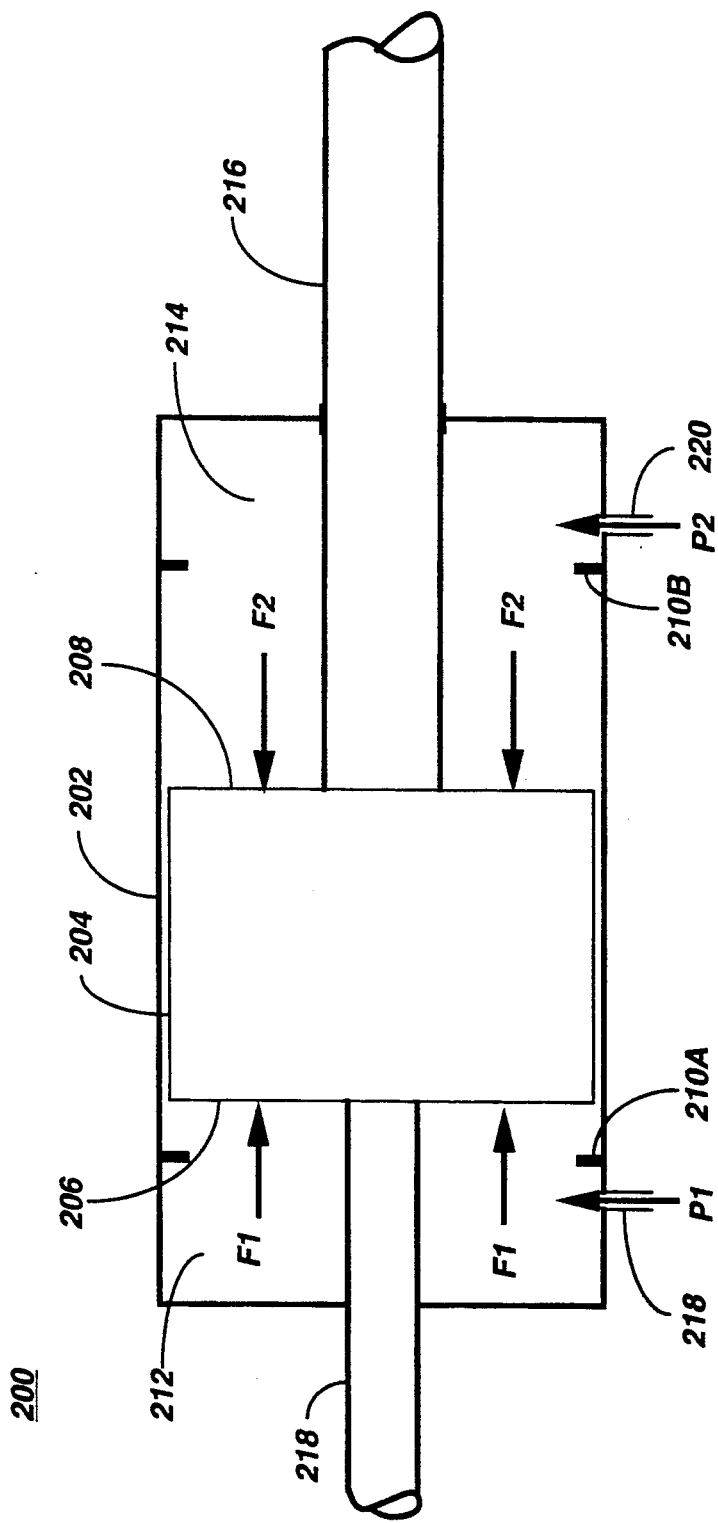
FIG. 2 is a more detailed block diagram of the circuit assembly device of FIG. 1.

FIG. 2 shows a more detailed block diagram of the circuit assembly device 200, which preferably comprises a cylinder 202 that contains a piston 204. The piston 204 is coupled to a shaft 216 which, in turn, is coupled to an end effector (not shown). End effectors are specialized or multi-function coupling devices for picking-up and placing parts in an automated factory. The shaft 216 is preferably hexagonal in shape (or other non-rotating shapes) to prevent rotation of the end effector when in use. As shown, the piston 204 preferably has a first face (side) 206 which defines a first chamber of the cylinder 212, and a second face (side) 208 preferably coupled to the shaft 216, which defines a second chamber of the cylinder 214. According to the preferred embodiment, the first face 206 is coupled to a second shaft 218 which via an orifice (not shown) establishes a vacuum at the end-effector for picking-up components or parts. A plurality of stops 210A, 210B, coupled to an internal section of the cylinder 202, limit the movement of the piston 204 in both directions. A first orifice 218 facilitates an application of a first pressure (P1) into the first chamber 212, and a second orifice 220 facilitates an application of a second pressure (P2) into the second chamber 214. In this way, the first pressure (P1) causes a force (F1) to be exerted on the first face 206 of the piston 204, and the second pressure (P2) causes a second force (F2) to be exerted on the second face 208 of the piston 204. The respective directions of the forces (F1 and F2) are denoted by their respective directional arrows.

Operationally, with the piston 204 arbitrarily positioned within the cylinder 202, the application of pressure (P1) through the orifice 218 causes the first force (F1) to move the piston 204 until it contacts with the plurality of stops 210B. In this way, the piston 204 moves the end effector to its exact position of operation. The application of the second pressure (P2) through orifice 220 causes the second force (F2) to be applied on the piston 204 in the opposite direction to the first force (F1). According to the invention, if the first and second pressures (P1 and P2) are equal, the first force (F1) will be greater than the second force (F2), because of the reduction of the area of the second face 208. In the preferred embodiment, the difference in shafts 216, 218 cause a difference in areas of the first and second faces 206, 208 which is given as:

Difference in areas $= Pi\ D1^2/4 - Pi\ D2^2/4$, where, the shafts, for convenience are substantially circular;
Pi is a constant; and
D1 is the diameter of shaft 216, and D2 is the diameter of shaft 218.

Therefore, the actual reduction in force is:

Delta $F = P2 \times Pi/4(D1^2 - D2^2)$ where, force is defined as (pressure $\times$ area); and
P1 = P2 are the first and second pressures.

In this way, the difference in diameters of the shafts 216, 218 may be chosen to generate the differential force (Delta F) applied to the piston 204 when the first and second pressures (P1 and P2) are substantially equal. Additionally, the differential force is also controlled by varying either or both of the first and second pressures (P1 and P2). This differential force constitutes the compliant force at the end-effectors to facilitate the assembly operation.

For example, by increasing pressure (P1), the second force (F1) is increased thereby increasing the differential force on the piston. Similarly, by decreasing the pressure (P2), the force (F2) is reduced thereby increasing the differential force on the piston. A person of ordinary skill in the art will appreciate that the reduction of the differential force may also be achieved by either decreasing the first force (F1) or increasing the second force (F2). In this way, the differential force is easily varied by varying the first and second pressures (P1 and P2). This is preferably accomplished by inputting or exhausting air (or fluid) from the first and second chambers 212, 214 of the cylinder 202. The first and second pressures (P1 and P2) are preferably generated by air, but any other suitable fluids may be used. This differential force, causes the compliant force to be established at the end-effectors, is used to exert a force upon the components or parts to be assembled, and is easily varied according to the fragility of the components or parts used in the assembly operation.

The preferred operation of the invention includes applying the first pressure (P1) to move the end effector(s) in position which, by conventional methods such as establishing a vacuum, will pick-up and place component parts, for example. However, before the "picking-up" operation, the second pressure (P2) is similarly applied. In this way, as described, the differential force is exerted on the piston 204, preferably in the direction of the first force (F1). In this way, the differential force is used to exert a compliant force on the component parts to be picked-up and placed. Thus, the compliant force may be easily varied to exert a higher or lower force on the component parts depending on the fragility of the component parts associated with the assembling procedure. Subsequent to placing a component part and removing the vacuum, the end effector is preferably moved out of position by discharging pressure (P1) through orifice 218, which causes the piston 204 to move in the direction of force (F2) until the piston 204 contacts with the plurality of stops 210A. Additionally, those skilled in the art will appreciate that, with the application of the first and second pressures (P1 and P2), the piston 204 will begin to float within the cylinder 202. This allows a smaller value of differential force to move the piston 204 in either directions. However, as shown in the preferred embodiment of FIG. 2, there is no seal between the piston 204 and the inside wall of the cylinder 202. This sealless embodiment causes a substantial reduction in friction between the piston 204 and the cylinder 202, which substantially reduces the differential forces needed to move the piston 204. In this way, a higher resolution in the compliant force is established on the end-effectors, that is, smaller variations on the compliant force can be exerted on the component parts to be assembled.

Thus, the built-in tolerance range of an end-effector may be quickly and efficiently varied with minimum effort, while prolonging the continuous operation without undue fatigue from continuous use.

We claim:

1. A circuit assembly device, comprising:
   a cylinder having a piston, wherein a first portion of the cylinder and a first face of the piston having a first area define a first chamber in the cylinder, and wherein a second portion of the cylinder and a second face of the piston having a second area define a second chamber in the cylinder;
   a first shaft of first cross-sectional area coupled to the first face, and a second shaft of second cross-sectional area coupled to the second face, wherein the first and second cross-sectional areas of the shafts differ and wherein the first and second areas of the faces differ due to the difference in the cross-sectional areas of the shafts;
   an end effector, connected to the piston by one of the shafts, for facilitating the circuit assembly;
   means for applying pressure to the first and second chambers, wherein the piston moves within the chamber when equal pressures are applied to the two chambers, and wherein the applied pressure and the difference in the areas of the first and second faces cause a compliant force to be generated at the piston; and
   means for varying the pressure within the first and second chambers independently, to vary the compliant force.

2. The circuit assembly device according to claim 1 wherein at least one of the first and second shafts has a substantially non-circular shape to prevent the piston from rotating within the cylinder.

3. The circuit assembly device according to claim 1 wherein the cylinder includes a plurality of means for limiting the movements of the piston.

4. The circuit assembly device according to claim 3, wherein the piston engages the means for limiting.

* * * * *